US009669701B2

(12) United States Patent
Bolt

(10) Patent No.: US 9,669,701 B2
(45) Date of Patent: Jun. 6, 2017

(54) COMPACT INTEGRATED MOTOR-GEAR DRIVE UNIT WITH CYCLOIDAL REDUCTION AND DEVICE INCORPORATING THIS UNIT

(71) Applicant: B.M. Innovaties B.V., Andelst (NL)

(72) Inventor: Johannes Jacobus Bolt, Zetten (NL)

(73) Assignee: B.M. Innovaties B.V., Andelst (NL)

( * ) Notice: Subject to any disclaimer, the term of this patent is extended or adjusted under 35 U.S.C. 154(b) by 0 days.

(21) Appl. No.: 15/039,476

(22) PCT Filed: Dec. 11, 2014

(86) PCT No.: PCT/EP2014/077390
§ 371 (c)(1),
(2) Date: May 26, 2016

(87) PCT Pub. No.: WO2015/086750
PCT Pub. Date: Jun. 18, 2015

(65) Prior Publication Data
US 2016/0361988 A1    Dec. 15, 2016

(30) Foreign Application Priority Data

Dec. 13, 2013  (NL) ...................................... 2011954
Jul. 14, 2014  (EP) ...................................... 14176841

(51) Int. Cl.
*F16H 1/32*     (2006.01)
*B60K 7/00*     (2006.01)
(Continued)

(52) U.S. Cl.
CPC .......... *B60K 7/0007* (2013.01); *B60K 17/043* (2013.01); *F16H 1/32* (2013.01);
(Continued)

(58) Field of Classification Search
CPC ........ B60K 7/0007; B60K 17/043; F16H 1/32
See application file for complete search history.

(56) References Cited

U.S. PATENT DOCUMENTS 8,506,438 B2 *  8/2013  Makino .................... B60K 1/00
                                                    475/159

FOREIGN PATENT DOCUMENTS

CN    102673380 A    9/2012
DE    8810135 U1     1/1989
(Continued)

OTHER PUBLICATIONS

D.C.H. Yang et al, Design and application guidelines for cycloid drives with machining tolerances, Mech. Mach. Theory, vol. 25, No. 5, pp. 487-501, 1990, Pergamon Press.
(Continued)

*Primary Examiner* — John Walters
*Assistant Examiner* — James Triggs
(74) *Attorney, Agent, or Firm* — Richard M. Goldberg

(57) ABSTRACT

An integrated motor-gear drive unit, for example an in-wheel motor, for transmitting rotational movement from a motor output shaft with cycloidal reduction to an outer rotatable body includes a mounting carrier body (3) and a secondary carrier body (2) structurally connected by at least two carrier pin devices (4, 11) forming a combined carrier body (2, 3, 4, 11); an outer rotatable body (1) rotatably supported on the mounting carrier body (3) and on the secondary carrier body (2); a motor (5) and a rotatable motor output shaft (6*m*), at least one cycloidal gear disc (10) and an eccentric body (8), wherein the eccentric body (8) is rotatably supporting the cycloidal gear disc (10) and wherein the motor output shaft (6*m*) is arranged for rotating the eccentric body (8) within the cycloidal gear disc (10), and a device to which such a unit is connected.

11 Claims, 7 Drawing Sheets

(51) Int. Cl.
    *B60K 17/04*     (2006.01)
    *H02K 7/116*     (2006.01)
    *H02K 7/14*     (2006.01)

(52) U.S. Cl.
    CPC ............... *H02K 7/116* (2013.01); *H02K 7/14* (2013.01); *B60K 2007/0038* (2013.01); *B60K 2007/0092* (2013.01); *B60Y 2200/80* (2013.01)

(56) References Cited

FOREIGN PATENT DOCUMENTS

| | | |
|---|---|---|
| EP | 2495122 A1 | 9/2012 |
| EP | 2562006 A1 | 2/2013 |
| GB | 1517112 A | 7/1978 |
| JP | 58-203250 A | 11/1983 |
| JP | 2007-292248 A | 11/2007 |
| WO | 2011/070882 A1 | 6/2011 |

OTHER PUBLICATIONS

B. Borislavov et al, Design of a Planetary-Cyclo-Drive Speed Reducer: Cycloid Stage, Geometry, Element Analyses, 2012, Linnaeus University.

* cited by examiner

COMPACT INTEGRATED MOTOR-GEAR DRIVE UNIT WITH CYCLOIDAL REDUCTION AND DEVICE INCORPORATING THIS UNIT

FIELD OF THE INVENTION

The invention relates to an integrated motor-gear drive unit, for example an in-wheel motor drive unit, for transmitting rotational movement from a motor output shaft with cycloidal reduction to an outer rotatable body. The integrated motor-gear drive unit can in particular be used as a wheel with an integrated motor on e.g. a mobile patient lift or a transportation cart.

BACKGROUND OF THE INVENTION

The invention offers a solution for the need for motor-gear drive units that require a large reduction (larger than 1:5) in a very compact and robust design. It is furthermore very suitable to be supported from one side. In certain applications of these motorized drive units, size restrictions are imposed by a demand for maneuverability and user friendliness. A good example of such an application is an indoors patient lift vehicle with steerable motorized traction wheels (FIG. 6). The motorized wheels must be very compact to allow for good operability in small interior spaces. The wheels should preferably be suspended from a single side to achieve more compactness. To be able to travel at slow speeds, the integrated drive reduction must be large enough to deliver a high output torque at a low rotational wheel speed. The invention aims at a more compact and robust design than the conventional motor-gear drives, which use for example a reduction mechanism with worm gears, multi-stage planetary gears or even cycloidal gears. Worm gears can achieve large reductions, but have as main disadvantages the large size, high friction and high demands on manufacturing tolerances.

Known motor-gear drive units predominantly use a planetary gear reduction, see for example CN102673380. A single stage planetary gear set is suitable for reductions as large as 1:5. To achieve larger reductions, multiple stages of planetary gear sets are used. However, this increases the size of the unit and increases the component count and manufacturing costs.

Cycloidal gear reduction, which is able to achieve larger reduction ratios than a planetary gear set is known. The following publications give an overview of the working and design principles of cycloidal gear reductions:

Design and application guidelines for cycloid drives with machining tolerances, D. C. H. Yang, J. G. Blanche, Mech. Mach. Theory Vol. 25, No. 5, pp. 487-501. 1990, Pergamon Press Design of a Planetary-Cyclo-Drive Speed Reducer: Cycloid Stage, Geometry, Element Analyses. B. Borislavov, I. Borisov & V. Panchev, 2012, Linnaeus University A known motor-gear drive unit which uses a cycloidal gear reduction is U.S. Pat. No. 8,506,438 B2, this and other similar motor-gear drive units operate with two meshing gear profiles wherein one of the meshing gear profiles comprises rollers and make use of the carrier/guide pins as the power output.

The available constructions fail to meet the needs for a compact design, a reduced axial width, a reduced component count, being suitable for mounting on a single side, and a high reduction ratio.

SUMMARY OF THE INVENTION

The invention comprises a compact integrated motor-gear drive unit with cycloidal reduction in which the motor output shaft transmits a rotational force at a highly reduced speed to an outer rotatable body. The complete unit can be mounted on one side in an application using the mounting carrier body. The outer rotatable body can for example be directly equipped with a tire which enables use of the invention as an extremely compact, single side mounted and high output torque, motorized wheel.

The outer rotatable body is rotatably supported on a combined carrier body, consisting of a mounting carrier body, a secondary carrier body and at least two carrier pin devices which structurally connect both carrier bodies. The open space between the carrier bodies enables the integration of a high reduction ratio cycloidal gear reduction consisting of one or more cycloidal gear discs. Each cycloidal gear disc is equipped with holes through which the carrier pin devices protrude. A carrier pin device can consist of a carrier pin, which can also include a rotatably supported carrier pin bushing.

Each cycloidal gear disc is rotatably supported, for example by means of a plain bearing or a separate gear disc bearing, on an eccentric body which is connected to the motor output shaft. The rotation of the eccentric body within the gear disc forces each cycloidal gear disc to move.

The holes in the cycloidal gear discs through which the carrier pin devices protrude, should have a large enough tolerance between the outer diameter of the carrier pin device and the inner diameter of the holes in each cycloidal gear disc, to allow for the motion that is forced by the rotating eccentric body on which the cycloidal gear disc is rotatably supported. On the other hand, the tolerance should not be larger than necessary. In an ideal situation the tolerance can be equal to twice the eccentricity of the eccentric element on which the cycloidal gear disc is mounted. In that case the carrier device can move and/or roll along the inner surface of the hole in the cycloidal gear disc, and rotation of the cycloidal gear disc about its own axis can be prevented. In case a larger tolerance is used, a limited although undesired rotation of the cycloidal gear discs can be possible. In the case of multiple cycloidal gear discs, a single carrier pin bushing per carrier pin device can be used, which protrudes through all cycloidal gear discs. This minimizes the component count of the complete unit and is advantageous because the rolling angular velocity of the bushing is equal for all cycloidal gear discs.

At least two carrier pin devices that protrude through the holes in the cycloidal discs are required to prevent rotation of the cycloidal gear discs. However it is advantageous to use three or more carrier pin devices, which can be equally divided on a pitch circle, to increase structural strength of the carrier assembly and to distribute the forces and stress uniformly over the carrier pin devices.

The outer gear profile of each cycloidal gear disc meshes with the internal gear profile of the outer rotatable body and their motion transmits the rotational motion of the motor output shaft at a highly reduced speed and increased torque to the outer rotatable body. This construction has the advantage of extreme compactness, high reduction ratio and a low component count. This is made possible because the carrier pin devices have a dual function, 1. they are an essential structural part of the unit and 2. they protrude through the cycloidal gear discs and function as an essential part of the gear reduction mechanism.

Multiple types of bearings can be used to rotatably support the outer rotatable body on the carrier bodies. An option is to use an angular contact ball or roller bearing. Using an angular contact type of bearing, the outer rotatable body is capable of supporting large external axial and radial forces directly to the mounting carrier body, without transferring these forces on the reduction gears. Because the design allows for a large diameter of the bearings, the unit is able to support very large axial and radial forces. An advantageous method to integrate an angular contact ball bearing is to manufacture the bearing raceways directly in the carrier bodies and outer rotatable body and utilize bearing balls and optionally a bearing ball cage. In this way a minimal amount of components is required and manufacturing costs are minimized. Naturally, any kind of rotatably supporting bearing can be used.

Cycloidal gear reductions can achieve very large reduction ratios in a compact design with common values between 1:8 and 1:130. The preferable arrangement uses the drive shaft connected to the motor output shaft as driving member, the carrier bodies as reaction member and the outer rotatable body as driven member. In this way a very compact design can be achieved, since the outer body can directly be used as a traction wheel possibly provided with a tire or used as a belt pulley or chain drive. The reduction ratio in this arrangement is defined as the difference of the number of teeth on the inner gear profile of the outer rotatable body and the number of teeth on the outer gear profile of one cycloidal disc, divided over the number of teeth on inner gear profile of the outer rotatable body. This ratio is slightly higher than in the conventional solution where the carrier pins function as driven output member(s): difference of the number of teeth on the inner gear profile of the outer rotatable body and the number of teeth on the outer gear profile of one cycloidal disc, divided over the number of teeth on the outer gear profile of a cycloidal disc. At least one, but preferably three cycloidal discs can be used at an evenly, angularly distributed eccentric position. The advantage of multiple discs is a better rotational balance, minimized vibration and reduction of the axial moment on the carrier pin devices and drive shaft. With three discs the axial moment and vibrations and noise are significantly reduced compared to a conventional solution with one or two discs. This is especially advantageous in the case of a high rotational input speed, for example when a high reduction ratio is used in combination with a compact, high power density electric motor which often have a high rotational speed.

The meshing of an outer cycloidal gear disc profile with an inner profile of the outer rotatable body can be performed using different methods. An advantageous method is the direct fabrication of an inner gear teeth profile in the outer rotatable body and an outer gear teeth profile on the cycloidal gear disc(s). This method has the advantage that it can be performed at low cost and with minimal additional components. Friction and/or contact noise can be minimized by using lubrication or a combination of body materials and/or coatings that limit friction and contact noise e.g. a combination of materials with different hardness.

Alternatively, the inside of the outer rotatable body can be equipped with cylindrical rollers, whereby the cycloidal gear disc gear teeth profile meshes with the rotatably supported bushings mounted in the outer rotatable body. This method has the drawback of increased complexity and size, but the advantage of decreased wear and improved efficiency, this method and a general cycloidal drive is for example described in the paper "Design and application guidelines for cycloid drives with machining tolerances" as referenced in the background section.

The movement of a point on the circumference of a cycloidal gear disc relative to the outer rotatable body can be described by an epitrochoid and/or hypotrochoid curve. This curve can also be used to generate an advantageous gear profile for either the inner or outer gear profiles. Other gear profiles or gear profiled inserts can be used as well. For example it is a possibility to use as an internal gear teeth profile a toothed belt or as an internal gear profile a roller chain as gear profile insert in the outer rotatable body.

The drive shaft, connected to the motor output shaft, can be provided with eccentric bodies to rotatably support and drive the motion of the cycloidal gear discs. These eccentric bodies can be directly manufactured on the drive shaft and/or motor output shaft. In the case of more than one eccentric body it can be advantageous to provide the drive shaft and/or motor output shaft with a profiled circumference, for example with an external spline or polygon profile. This profile can be directly manufactured on the drive shaft and/or motor output shaft, or be provided on a separate outer bushing which can be rigidly and concentrically connected to the drive shaft and/or motor output shaft, for example by a press fit. The eccentric bodies can be provided with an internal profile that can interlock with the provided external profile on the drive shaft and/or motor output shaft to enable accurate positioning of the eccentric bodies and their relative angles. This method enables low cost production and simple and accurate assembly of the eccentric bodies on the drive shaft and/or motor output shaft. Preferably the amount of splines or polygon faces on the external profile is dividable by the number of gear discs used, so the angle of rotation of each fitted eccentric body compared to the next can be divided equally.

The gear-drive unit can be equipped with an integrated electrical motor. The large leverage of the transmitted torque by the cycloidal gear system allows for the use of compact motors, operating at relatively high rotational speeds with a high power density. This is a favorable property especially in applications where the rotational speed of the outer rotatable body is low.

As mentioned before, the gear drive unit of the invention can very suitably be used on an indoors patient lift vehicle with steerable motorized traction wheels (FIG. 6). Other suitable applications could be in the field of belt drives where the outer rotatable body directly drives a belt pulley; or chain drives where the outer rotatable body is equipped with a chain drive wheel; in machinery, lifts, small traction wheels for robots or warehouse carts (FIG. 6); or electric bikes, where the motor-gear drive unit is integrated in the rear or wheel as wheel hub motor where the outer rotatable body is used as a wheel hub for a spoked wheel or directly connected to the bottom bracket.

The motor can be a radial or an axial flux motor, with a preferable solution being a high speed axial gap motor, because of the minimal axial space requirements and high power density. Radial flux motors are another suitable alternative, but can have the disadvantage of using more axial space. Preferably, the motor is concentrically fixed to the mounting carrier plate. However, other arrangements are possible such as in which the motor and mounting carrier plate are aggregated into one part, or in which the motor is positioned non-concentric relative to the outer rotatable body. Optionally, the design can be equipped with a braking device that brakes the outer rotatable body relative to the mounting carrier body. An additional feature could be a clutch or freewheel, for example between the motor output shaft and drive shaft.

BRIEF DESCRIPTION OF THE DRAWINGS

Figures

FIGS. 5A and 5B are schematic views of the carrier construction, including a side view and an exploded view, respectively, of the carrier bodies and carrier pins of the embodiment of FIG. 1.

REFERENCE NUMBERS USED IN FIGURES

Figure 1:
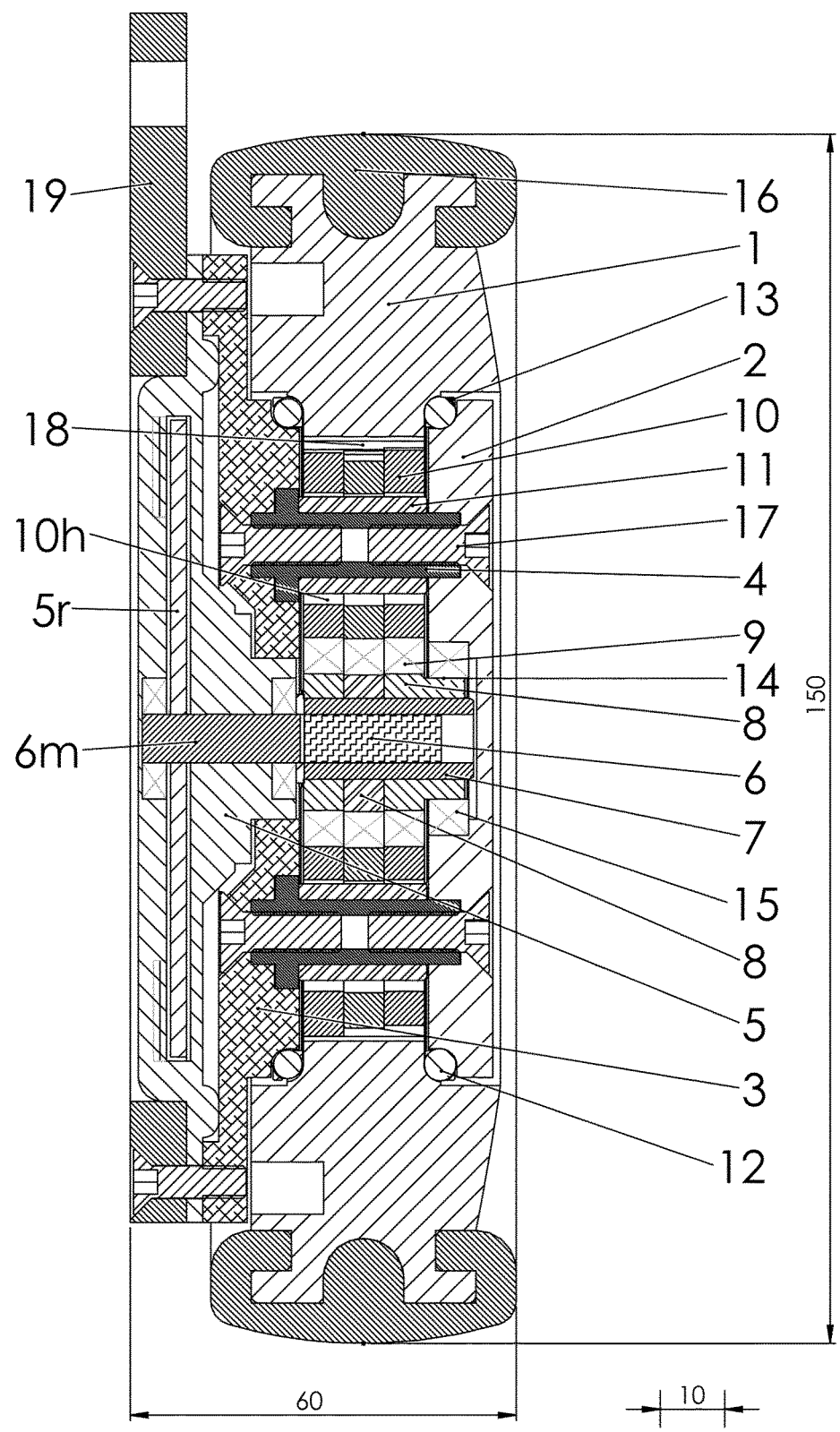
FIG. 1 is a cross sectional view of an embodiment of the invention as direct traction drive or motorized wheel, where the outer rotatable body is fitted with a tire.

1. Outer rotatable body
2. Secondary carrier body
3. Mounting carrier body
4. Carrier pin
5. Motor
5r. Motor rotor
6. Drive shaft
6m. Motor output shaft
7. Separate outer bushing exemplified with external hexagonal profile
8. Eccentric body exemplified with internal hexagonal profile
9. Gear disc bearing
10. Cycloidal gear disc with external gear teeth profile
10h. Hole
11. Carrier pin bushing
12. Bearing ball
13. Bearing cage
14. Section having a bearing surface, the surface being concentric to the drive shaft
15. Drive shaft/bushing bearing
16. Tire
17. Fastener
18. Internal gear teeth profile
19. External body on which the motor-gear drive unit is mounted
20. O-ring on eccentric body

DETAILED DESCRIPTION OF A PREFERRED EMBODIMENT

Figure 2:
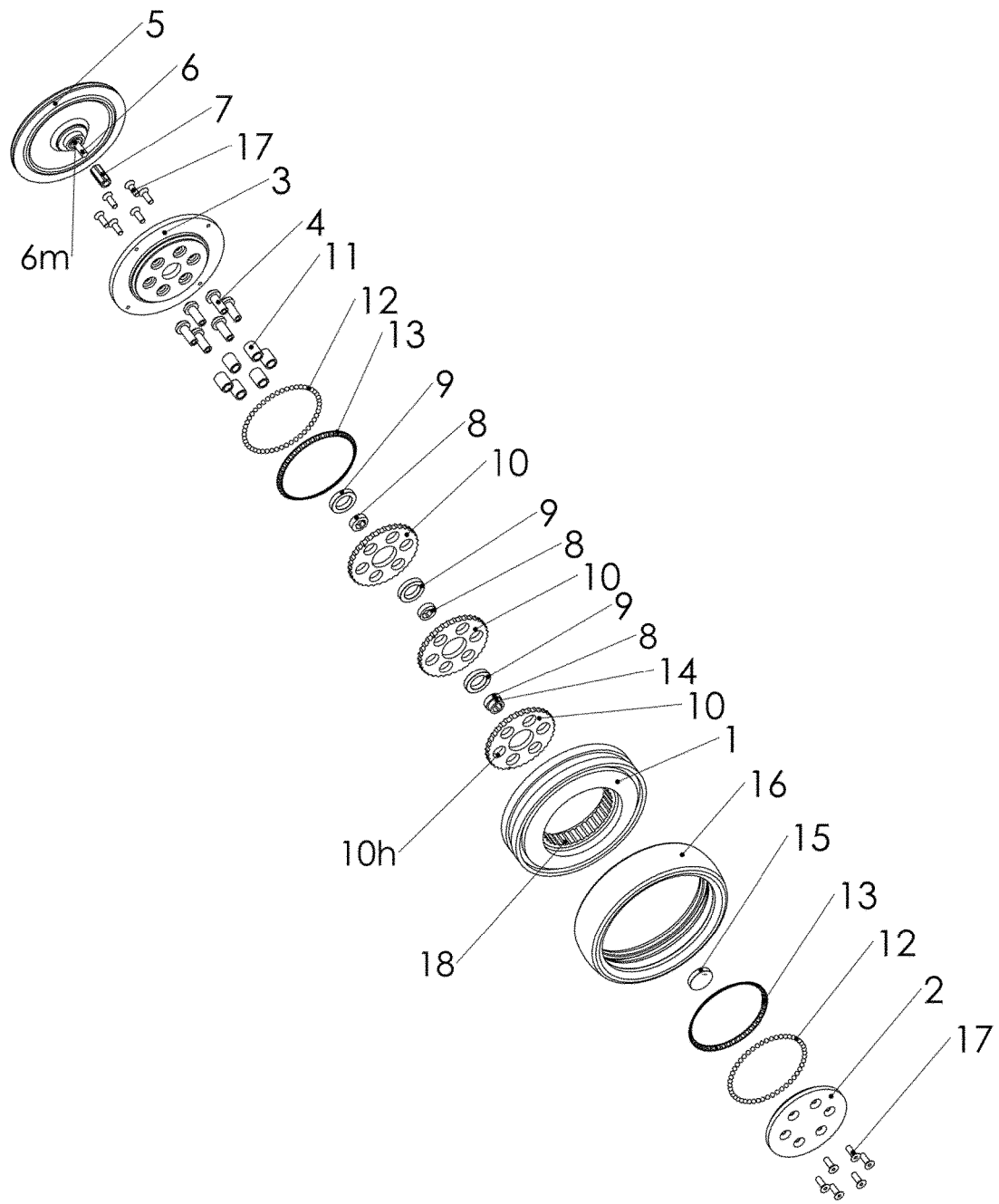
FIG. 2 is an exploded view of the embodiment of FIG. 1.
Figures 5, 5B:
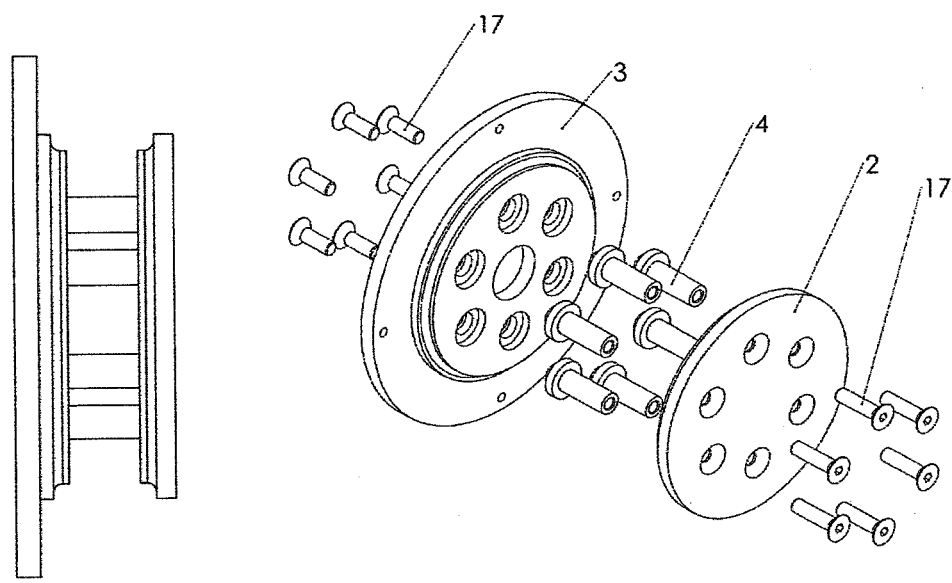
Figures 6A, 6B, 6C:
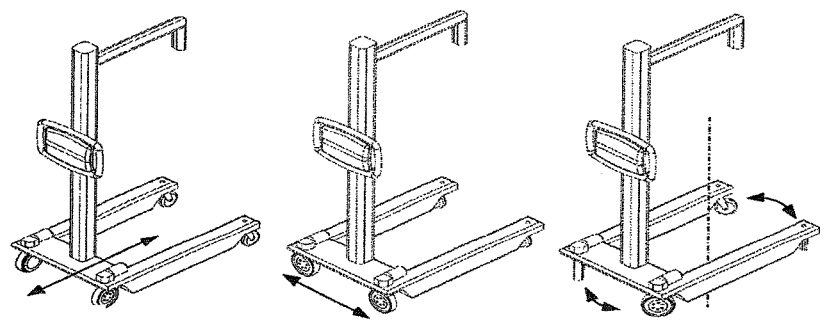
FIGS. 6A-6D display possible utilization of e.g. two directly driven wheels of the invention applied to a patient lift or to a cargo transportation cart, where the front wheels are trailing.
Figure 6D:
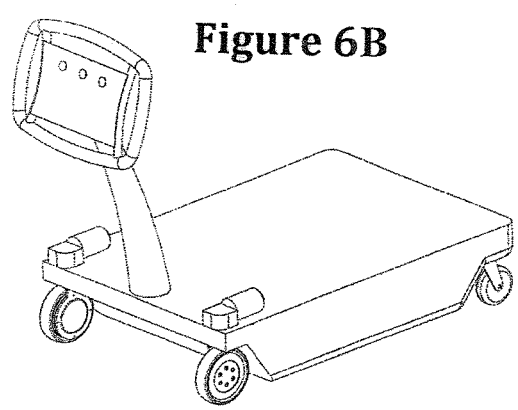

FIGS. 1 and 2 illustrate an exemplified compact integrated motor-gear drive unit with a high reduction ratio (more than 1:5) by use of a cycloidal gear reduction. The outer rotatable body (1), in this case a ring shape, functions as the output of the unit and can be provided with an internal gear teeth profile (18) in the same body. The complete unit can be mounted on one side by the mounting carrier body (3) which is rigidly connected to the secondary carrier body (2) by the, in this case six, carrier pins (4) with the help of e.g. fastening screws or bolts (17). The carrier pins are part of carrier pin devices. In the illustrated embodiment, the carrier pin devices comprise the carrier pins (4), carrier pin bushings (11) and the fastening screws or bolts (17). FIG. 5 displays the assembly of carrier bodies and carrier pins which are rigidly attached to each other, for example by the fastening screws or bolts (17) and threaded holes in the carrier pins. The carrier pin devices are a functional part of the gear reduction, they protrude through holes (10h) in each cycloidal gear disc (10). The inside diameter of each hole (10h) in each gear disc is at least equal to, or larger than, the carrier pin bushing (11) diameter plus twice the distance of eccentricity of the eccentric body driven by the motor output shaft. This enables the carrier pin bushing to move along the inside wall of the cylindrical hole in the gear disc. The carrier pin devices guide the gear discs to allow the motion of the gear discs forced by the rotating eccentric bodies, but prevent rotation of the cycloidal gear discs about their own axis. The outer rotatable body is rotatably supported on the mounting carrier body (3) and secondary carrier body (2) which are part of the combined carrier body (2,3,4,11,17). This can e.g. be performed by the use of angular contact bearings, consisting of bearing balls (12), bearing cages (13) and bearing raceways directly manufactured in the outer rotatable body, mounting carrier body and secondary carrier body. Alternative bearings can be used e.g. comprising separate bearing raceways mounted to the outer rotatable body and/or mounting carrier body and/or secondary carrier body. In this case the outer rotatable body is able to transmit large axial and radial forces to the mounting carrier body.

This construction, specifically the combination of the carrier pin devices as essential member of the reduction gearing and as a structural part, enables the integration of a high ratio (1:36 in this case) cycloidal reduction gear mechanism inside a rotatable outer body. This construction has a low component count, a small width and diameter, enabling a very compact and easy to manufacture design. None of the external axial and radial forces on the outer rotatable body are transmitted to the gear discs, eccentrics, drive shaft or motor output shaft. The outer surface of the outer rotatable body can possibly be equipped with a tire (16), for improving the direct use of the unit as a motorized wheel in traction applications. For better attaining the object of a compact, flat unit with reduced axial width, a plane orthogonal to the motor output shaft and/or drive shaft can intersect both a said cyclodial gear disc and the tire.

In this case an axial gap electric motor (5), such as a pancake motor, is integrated in the unit for better attaining the object of a compact, flat unit with reduced axial width. The stator and housing of the electric motor can be connected to the mounting carrier body. The speed of the drive shaft (6), formed-by or connected-to the motor output shaft (6m), is reduced by a cycloidal reduction, consisting of at least one cycloidal gear disc, in this case three cycloidal gear discs (10) are used. The cycloidal gear discs have an external gear profile and are each driven by an eccentric body (8) attached to the drive shaft (6).

For rotatably driving the eccentric bodies (8) the drive shaft (6) respectively the motor output shaft (6m) can be directly or indirectly provided with an external spline or polygon profile. In the illustrated embodiment a hexagon outer profile is indirectly provided on a separate outer bushing (7) connected to the drive/motor output shaft (6,6*m*). The outer bushing (7) can be rigidly and concentrically connected to the motor output/drive shaft, for example by a press fit. An axial opening with corresponding internal hexagonal profile is formed in each eccentric body (8).

Preferably, the amount of splines or polygon faces is dividable by the number of gear discs used, so the angle of rotation of each fitted eccentric body (8) compared to the next can be divided equally. In the illustrated case of three discs, a relative angle of 120 degrees between the eccentric bodies is used. Each of the eccentric bodies (8) can be mounted with its opening having the internal hexagonal profile in the axial direction over the shaft/bushing with its corresponding external hexagonal profile. Thereby the shaft/bushing can rotationally drive the eccentric bodies (8) within the cycloidal gear discs.

Figure 3A:
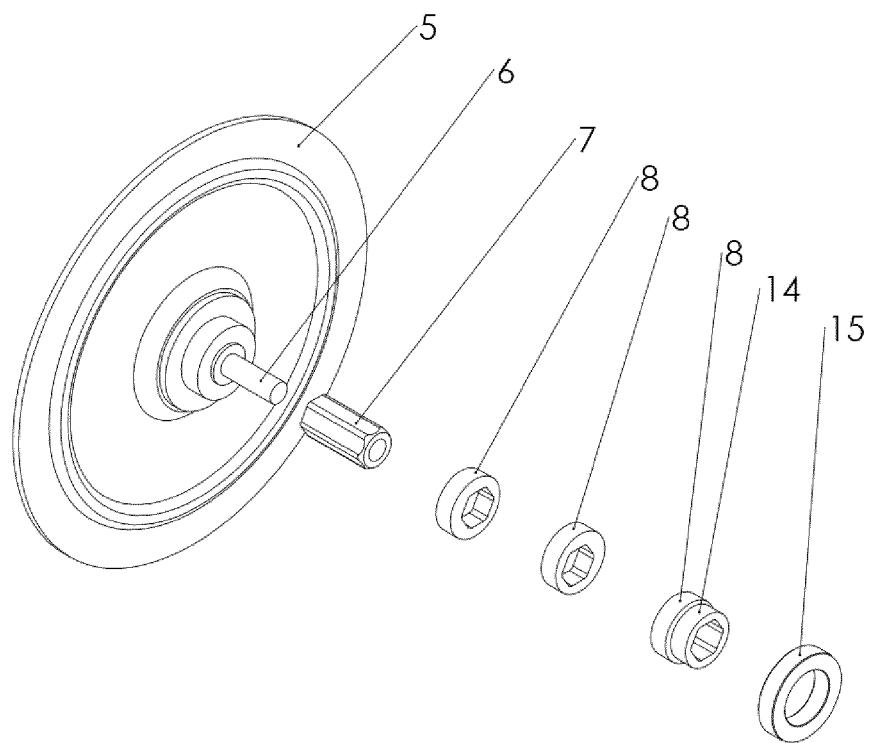
FIG. 3a is an exploded view of the embodiment of FIG. 1, only including the motor, motor output shaft, profiled bushing, eccentric bodies and motor output shaft bearing.
Figure 3B:
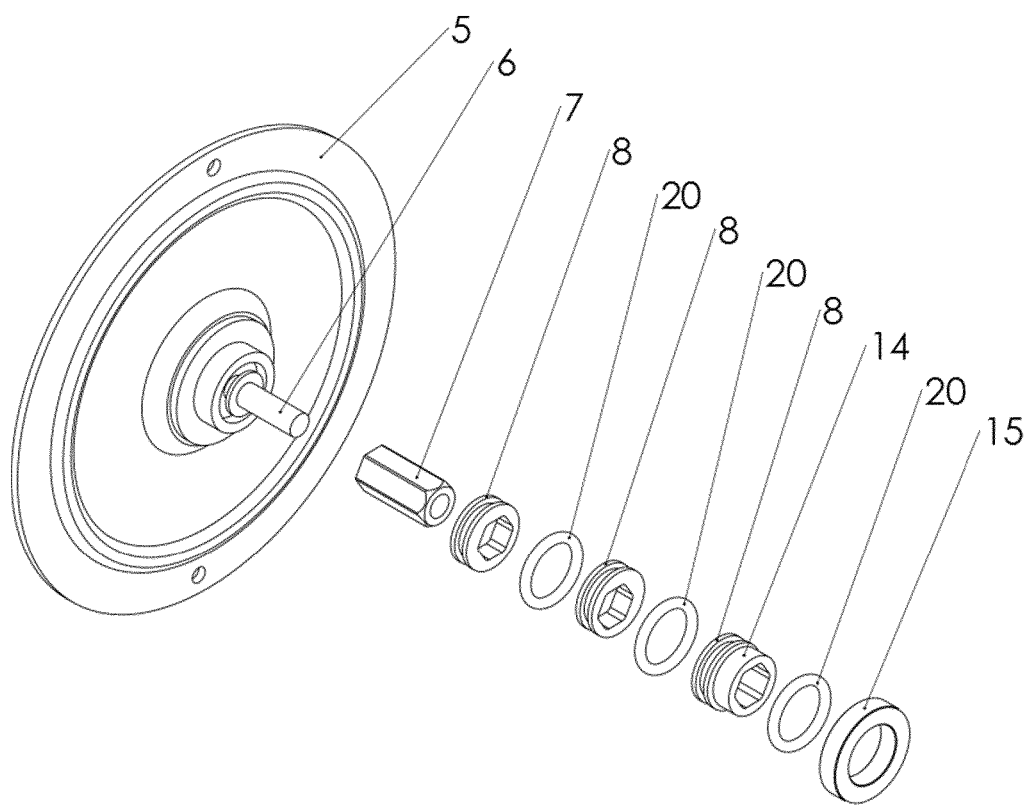
FIG. 3b is an exploded view identical to FIG. 3a, but including an additional O-ring on each eccentric body.

The use of a profiled bushing/shaft makes it possible to easily mount multiple eccentric bodies on the shaft at equally divided angles and assemble the eccentric bodies, gear disc bearings and gear discs. In this case of three cycloidal gear discs, an angle difference of 120 degrees is used for each subsequent eccentric body, this improves the rotational balance, distributes force on the drive shaft, carrier pin devices and outer rotatable body and minimizes resulting torque along the axial direction. The last eccentric body (8) can—as shown in the illustrated embodiment—also be equipped with a section having a circular surface (14), concentric to the drive/motor-output shaft to support the shaft/bushing indirectly in a bearing (15) in the secondary carrier body (2). Alternatively, the shaft and/or bushing can be directly supported by the bearing (15). FIG. 3*a*, 3*b* illustrates the assembly of the drive/motor-output shaft and eccentric bodies. The direct or indirect support of the drive shaft and/or motor output shaft in the second carrier body can be advantageous in the sense that it minimizes torque and bending forces on the shaft and thereby also enables a more uniform distribution of forces among the cycloidal gear discs.

Figure 4:
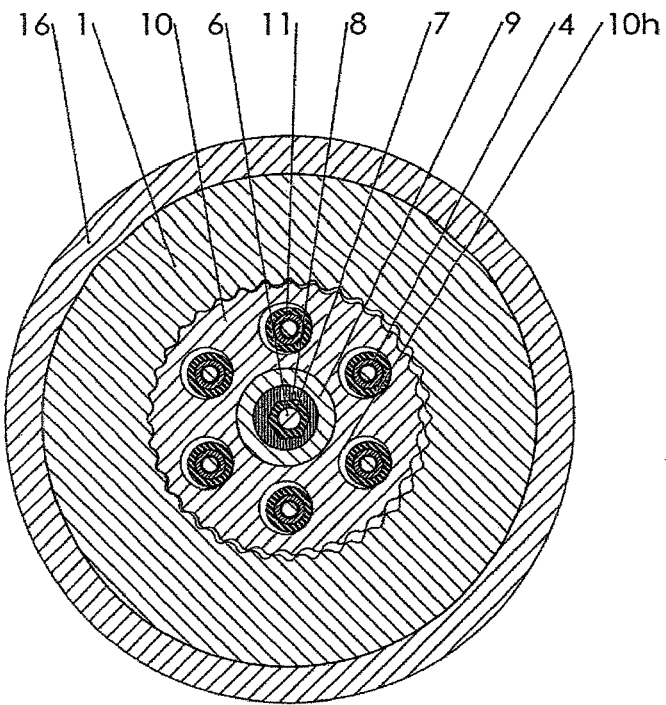
FIG. 4 is a cross sectional view, cutting through a cycloidal gear disc of the embodiment of FIG. 1.

The cycloidal gear discs are rotatably supported on the eccentric bodies, possibly—as shown in FIG. 4 by a separate gear disc bearing (9). Moreover an/each eccentric body can be provided with a groove and an elastic O-ring (20) in that groove, whereby an extra tolerance between the eccentric body and the gear disc bearing can be provided which is filled by the O-ring. The O-ring (20) introduces a flexible element in the system to absorb any backlash due to manufacturing tolerances and thereby minimizes contact noise, allowing for a more quiet operation. This alternative construction is shown in FIG. 3*b*.

The cycloidal gear discs are provided with cylindrical holes (10*h*) through which the carrier pin devices (4, 11) protrude. The tolerance between the holes (10*h*) in the cycloidal gear discs and the carrier pin devices (4,11) is large enough to allow for the motion of the gear discs which is forced by the eccentric bodies rotating within the gear discs, but small enough to prevent meaningful rotation of the cycloidal gear discs around their own axis.

FIG. 4 illustrates one of the gear discs (10) that is mounted inside the outer rotatable body (1), rotatably supported by a gear disc bearing (9) on the eccentric body (8) which is mounted on the shaft/bushing. The external gear teeth profile of each cycloidal gear disc (10) meshes with the internal gear teeth profile (18) of the outer rotatable body (1). During operation, rotation of the gear discs around their own axis is prevented by the guidance of the carrier pin bushings which move or roll along the inside surface of the holes in the gear discs. Rotation of the eccentric body (8) within the cycloidal gear disc (10) forces motion of the gear disc. Because the external gear teeth profile of the cycloidal gear discs (10) are constantly meshed with the internal gear teeth profile (18) of the outer rotatable body (1), but each gear disc external gear teeth profile has less teeth than the internal gear teeth profile of the outer rotatable body, the rotating motion of the drive shaft is transmitted to the outer rotatable body in a fashion that reduces the rotational speed but increases the torque.

Figure 7:
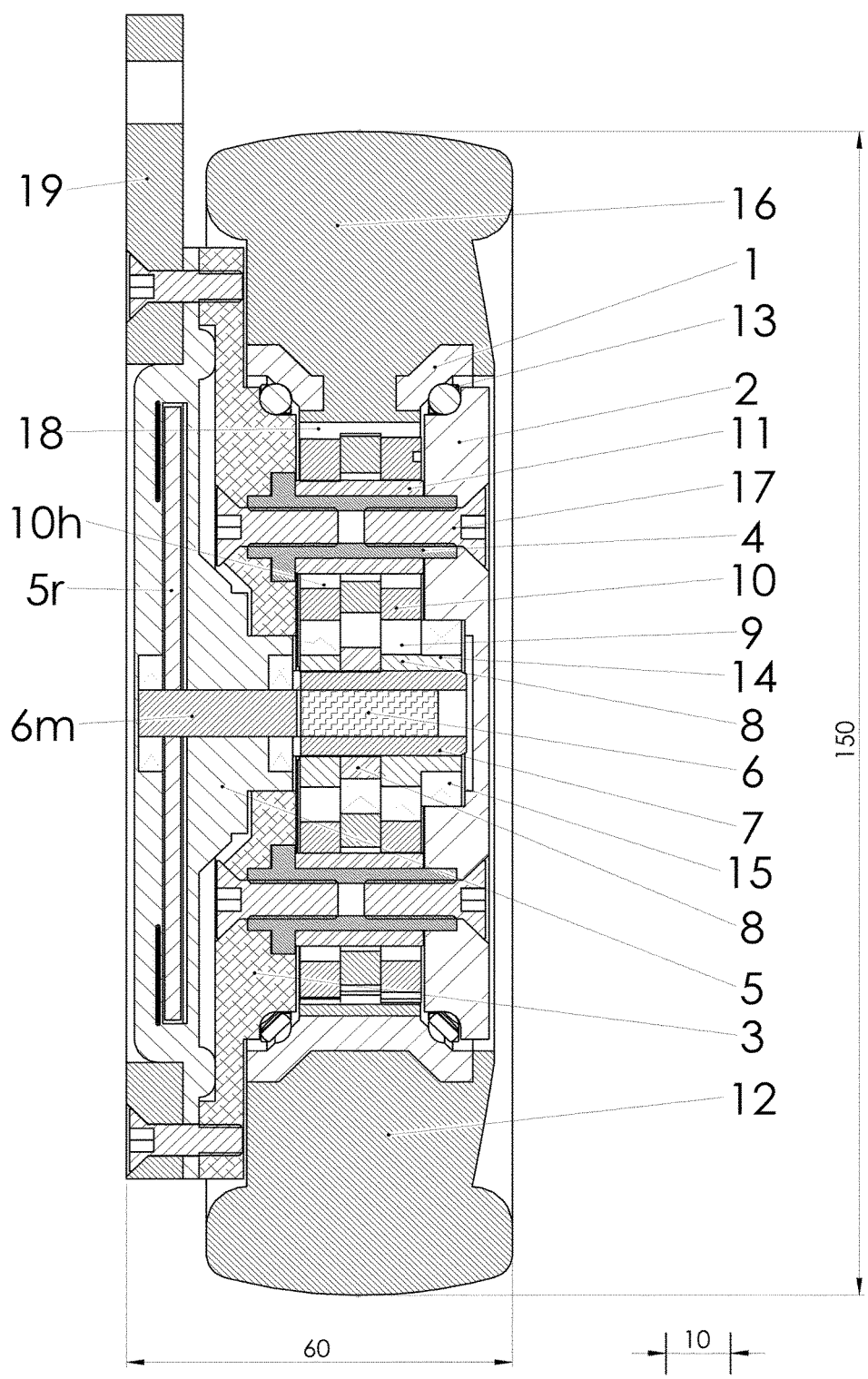
FIG. 7 is a cross sectional view of an alternative embodiment of the invention as direct traction drive or motorized wheel, where the tire and internal gear teeth profile are from the same material and molded around the outer rotatable body.

FIG. 7 illustrates an alternative preferred embodiment wherein the tire (16) and internal gear teeth profile (18) are of the same material, such as a rubber or plastic. The outer rotatable body (1) can be provided with openings along the circumference that allow the tire and the internal gear teeth profile to be molded and structurally connected to the outer rotatable body. Alternatively the outer rotatable body can be constructed of two bodies that are located on both sides of the body comprising the tire and the internal gear teeth profile.

In the exemplified compact and integrated motor-gear drive unit, illustrated in FIG. 1 and FIG. 2, the diameter of the outer rotatable body including the tire is approximately 150 mm and the width of the motor-gear drive unit is approximately 60 mm (including motor). Preferably the outer diameter of the outer rotatable body including the tire is less than 250 mm and the width of the unit including the motor and the tire is less than 75 mm. Preferably, said outer diameter is more than twice said width, more preferably more than 2.4 times said width.

Other aspects of the invention;

According to an alternative first other aspect of the invention, a gear drive unit is provided for transmitting rotational movement at a reduced speed from a drive shaft to an outer rotatable body with a cycloidal reduction; the integrated gear drive unit comprising: a mounting carrier body (3) and a secondary carrier body (2), wherein the mounting carrier body (3) and the secondary carrier body (2) are structurally connected by at least two carrier pin devices (4,11) forming a combined carrier body (2,3,4,11); an outer rotatable body (1) is rotatably supported on the mounting carrier body (3) and/or on the secondary carrier body (2); at least one cycloidal gear disc (10) and an eccentric body (8), wherein the cycloidal gear disc (10) is rotatably supported on the eccentric body (8) and wherein the drive shaft (6) is arranged for rotating the eccentric body (8) within the cycloidal gear disc (10); wherein said at least one gear disc (10) has at least two holes (10*h*) corresponding to said at least two carrier pin devices (4,11), and wherein each carrier pin device (4,11) protrudes through a corresponding hole (10*h*);

wherein each said at least one gear disc (10) is provided with an external profile and the outer rotatable body (1) is provided with an internal profile and the external profile of the cycloidal gear disc meshes with the internal profile of the outer rotatable body; wherein said profiles are gear teeth profiles or alternatively one of said profiles is formed with rollers.

The gear drive unit according to the first other aspect, characterized in that a motor (5) is mounted to or is part of the mounting carrier body (3), wherein a rotatable motor output shaft (6*m*) is connected to and/or part of the drive shaft (6).

Further aspects described by the invention:

In a first aspect, an integrated motor-gear drive unit, for example an in-wheel motor drive unit, for transmitting rotational movement from a motor output shaft with cycloidal reduction to an outer rotatable body; the integrated motor-gear drive unit comprising:
  a. a mounting carrier body (3) and a secondary carrier body (2), wherein the mounting carrier body (3) and the secondary carrier body (2) are structurally connected by at least two carrier pin devices (4,11) forming a combined carrier body (2,3,4,11);
  b. an outer rotatable body (1) rotatably supported on the mounting carrier body (3) and on the secondary carrier body (2);
  c. a motor (5) and a rotatable motor output shaft (6*m*), wherein the motor is mounted to or is part of the mounting carrier body (3),
  d. at least one cycloidal gear disc (10) and an eccentric body (8), wherein the eccentric body (8) is rotatably supporting the cycloidal gear disc (10) and wherein the motor output shaft (6*m*) is arranged for rotating the eccentric body (8) within the cycloidal gear disc (10), and wherein said at least one gear disc (10) has at least two holes (10*h*) corresponding to said at least two carrier pin devices (4,11), and wherein each carrier pin device (4,11) protrudes through a corresponding hole (10*h*);
  e. wherein each said at least one gear disc (10) is provided with an external gear profile and the outer rotatable body (1) is provided with an internal gear profile and wherein the external gear profile of the cycloidal gear disc meshes with the internal gear profile of the outer rotatable body for transmitting rotational motion of the motor output shaft to the outer rotatable body.

2. The motor-gear drive unit of aspect 1 here above, characterized in that the internal gear profile of the outer rotatable body is formed by an internal gear teeth profile (18) and the external gear profile of the cycloidal gear disc is formed by an external gear teeth profile.

3. The motor-gear drive unit of any of the preceding aspects, characterized in that the eccentric body (8) is rotatably drivable by the motor output shaft (6*m*) and/or by a drive shaft (6) connected to the motor output shaft (6*m*), wherein an external spline or polygon profile is provided on the motor output shaft (6*m*) or on the drive shaft (6) or on a separate outer bushing (7) structurally connected to the drive- and/or motor output shaft (6,6*m*), wherein an axial opening formed in the corresponding eccentric body is provided with a corresponding internal spline or polygonal profile allowing the eccentric body to be axially mounted on the externally profiled shaft or bushing, and wherein preferably the number of faces of said profile is equal to or a multitude of the number of cycloidal discs that is used, whereby the externally profiled shaft or bushing interlocked with the internally profiled eccentric bodies can rotationally drive the eccentric bodies (8) within the cycloidal gear discs.

4. The motor-gear drive unit of any of the preceding aspects, characterized in that the motor output shaft (6*m*) and/or a drive shaft (6) connected to the motor output shaft (6*m*) and/or a component connected to the drive/motor output shaft is rotatably supported in the secondary carrier body (2).

5. The motor-gear drive unit of any of the preceding aspects, characterized in that n=three or more cycloidal gear discs are used, in particular in that:
  n cycloidal gear discs; and
  n corresponding eccentric bodies each with an internal profile wherein the number of faces of said profile is equal to or a multitude of n;
are used.

6. The motor-gear drive unit of any of the preceding aspects, characterized in that bearing raceways of the bearing supporting the outer rotatable body are manufactured in the outer rotatable body, mounting carrier plate and secondary carrier plate; and/or that one, some or all of the bearing raceways are provided as separate parts.

7. The motor-gear drive unit of any of the preceding aspects, characterized in that the mounting carrier body (3) is a part of the motor, such as a part of a motor housing or a part of a motor body.

8. The motor-gear drive unit of any of the preceding aspects, characterized in that the outer surface of the outer rotatable body is provided with a tire (16) for improving the direct use of the unit as a motorized wheel in traction applications, or the outer rotatable body is provided with a chain drive wheel, or the outer rotatable body is adapted for use as a wheel hub for a spoked wheel, or the outer rotatable body is adapted for directly driving a belt pulley.

9. The motor-gear drive unit of any of the preceding aspects, characterized in that the mounting carrier plate (3) is provided with means or structures for facilitating the mounting of the motor-gear unit only via the mounting carrier plate (3) to a device such as e.g. a mobile patient lift or a transportation cart or another vehicle.

10. The motor-gear drive unit of any of the preceding aspects, characterized in that the motor (5) is an electric or pneumatic motor, in particular that the motor (5) is an axial gap electric motor, such as e.g. a pancake motor.

11. The motor-gear drive unit of any of the preceding aspects, characterized in that the at least one cycloidal gear disc (10) is rotatably supported on the corresponding eccentric body by means of a separate bearing (9) and/or wherein the corresponding eccentric body (8) is manufactured on the motor output shaft (6*b*) or drive shaft (6) or separate outer bushing (7).

12. The motor-gear drive unit of any of the preceding aspects, characterized in that the motor output shaft can be decoupled by a clutch or freewheel between the motor output shaft and eccentric bodies and/or in that a brake is integrated that directly or indirectly prevents relative motion of the motor shaft or outer rotatable body relative to the mounting carrier body.

13. The motor-gear drive unit of any of the preceding aspects, characterized in that each said carrier pin device (4,11) protrudes through a said corresponding hole (10*h*) with a tolerance enabling each carrier pin device in operation to move within the corresponding hole (10*h*) allowing motion of the cycloidal gear disc, forced by the rotating eccentric body, but preventing rotation of the cycloidal gear disc (10) around its axis, and/or alternatively characterized in that the inside diameter of each hole (10*h*) in the cycloidal gear disc (10) is at least equal to the outside diameter of the corresponding carrier pin device (4,11) plus twice the distance of eccentricity of the eccentric body (8), thereby enabling the carrier pin device to move and/or roll along the inside wall of the cylindrical hole in the gear disc (10).

14. The motor-gear drive unit of any of the preceding aspects, characterized in that the carrier pin devices (4,11) comprise carrier pins (4) and corresponding carrier pin bushings (11), wherein each carrier pin bushing (11) preferably is rotatably supported on the corresponding carrier pin (4).

15. The motor-gear drive unit of any of the preceding aspects, characterized in that the outer diameter of the outer rotatable body (1) together with the tire (3) is less than 250 mm and the width of the drive unit including the motor (5) and the tire (3) is less than 75 mm.

16. Device such as a mobile patient lift or a transportation cart or another vehicle, characterized in that a motor-gear drive unit as defined in any of the previous aspects is connected to the device by/via the mounting carrier body (3).

Still further embodiments described by the invention:

1. An integrated motor-gear drive unit, for example an in-wheel motor drive unit, for transmitting rotational movement from a motor output shaft with cycloidal reduction to an outer rotatable body; the integrated motor-gear drive unit comprising:
   a. a mounting carrier body (3) and a secondary carrier body (2), wherein the mounting carrier body (3) and the secondary carrier body (2) are structurally connected by at least two carrier pin devices (4,11) forming a combined carrier body (2,3,4,11);
   b. an outer rotatable body (1) rotatably supported on the mounting carrier body (3) and on the secondary carrier body (2);
   c. a motor (5) and a rotatable motor output shaft (6m), wherein the motor is mounted to or is part of the mounting carrier body (3),
   d. at least one cycloidal gear disc (10) and an eccentric body (8), wherein the eccentric body (8) is rotatably supporting the cycloidal gear disc (10) and wherein the motor output shaft (6m) is arranged for rotating the eccentric body (8) within the cycloidal gear disc (10), and wherein said at least one gear disc (10) has at least two holes (10h) corresponding to said at least two carrier pin devices (4,11), and wherein each carrier pin device (4,11) protrudes through a corresponding hole (10h);
   e. wherein each said at least one gear disc (10) is provided with an external gear profile and the outer rotatable body (1) is provided with an internal gear profile and wherein the external gear profile of the cycloidal gear disc meshes with the internal gear profile of the outer rotatable body for transmitting rotational motion of the motor output shaft to the outer rotatable body, wherein the internal gear profile of the outer rotatable body is formed by an internal gear teeth profile (18) and the external gear profile of the cycloidal gear disc is formed by an external gear teeth profile;
   f. wherein the eccentric body (8) is rotatably drivable by the motor output shaft (6m) and/or by a drive shaft (6) connected to the motor output shaft (6m), wherein an external profile is provided on the motor output shaft (6m) or on the drive shaft (6) or on a separate outer bushing (7) structurally connected to the drive- and/or motor output shaft (6,6m), wherein an axial opening formed in the corresponding eccentric body is provided with a corresponding internal profile allowing the eccentric body to be axially mounted on the externally profiled shaft or bushing.

2. The motor-gear drive unit of the first embodiment described directly here above, characterized in that the outer surface of the outer rotatable body is provided with a tire (16) for improving the direct use of the drive unit as a motorized wheel in traction applications, and wherein a plane orthogonal to the motor output shaft and/or drive shaft intersects both a said cycloidal gear disc and the tire.

3. The motor-gear drive unit of any of the embodiments described directly here above, characterized in that the motor (5) is an axial gap electric motor, such as e.g. a pancake motor.

4. The motor-gear drive unit of any of the embodiments described directly here above, characterized in that the diameter of the outer rotatable body (1) together with the tire (16) is less than 250 mm and the width of the drive unit including the motor and the tire is less than 75 mm.

5. The motor-gear drive unit of any of the embodiments described directly here above, characterized in that the diameter of the outer rotatable body (1) together with the tire (3) is more than twice the width of the drive unit including the motor, more preferably more than 2.4 times said width.

6. The motor-gear drive unit of any of the embodiments described directly here above, characterized in that n=three or more cycloidal gear discs are used, in particular in that:
   n cycloidal gear discs; and
   n corresponding eccentric bodies each with an internal profile wherein the number of faces of said profile is equal to or a multitude of n;
   are used.

7. The motor-gear drive unit of any of the embodiments described directly here above, characterized in that the mounting carrier body (3) is a part of the motor, such as a part of a motor housing or a part of a motor body.

8. The motor-gear drive unit of any of the embodiments described directly here above, characterized in that the mounting carrier plate (3) is provided with an external body (19) for facilitating the mounting of the motor-gear drive unit only via the mounting carrier plate (3) to a device such as e.g. a mobile patient lift or a transportation cart or another vehicle, and wherein the outer diameter of the outer rotatable body (1) together with the tire (16) is less than 250 mm and the width of the drive unit together with the external body (19) and including the motor (5) and the tire (16) is less than 75 mm.

9. The motor-gear drive unit of any of the embodiments described directly here above, characterized in that, some or all of the, bearing raceways of the bearing supporting the outer rotatable body are manufactured in the outer rotatable body, mounting carrier body and/or secondary carrier body.

10. The motor-gear drive unit of any of the embodiments described directly here above, characterized in that the tire and the internal gear teeth profile are of the same material.

11. Device such as a mobile patient lift or a transportation cart or another vehicle, characterized in that a motor-gear drive unit as defined in any of the embodiments described directly here above is connected to the device by/via the mounting carrier body (3).

A further aspect which can be used with all previous aspects and embodiments relates to the provision of said eccentric body/bodies (8) having elastic and/or flexible properties for absorbing any backlash and/or tolerances, e.g. a said eccentric body being provided with an elastic/flexible ring e.g. said eccentric body being provided with a groove having an elastic/flexible ring therein e.g. an O-ring.

What is claimed is:

1. An integrated motor-gear drive unit for transmitting rotational movement from a motor output shaft with cycloidal reduction to an outer rotatable body, the integrated motor-gear drive unit comprising:
   a. a mounting carrier body and a secondary carrier body,
   b. at least two carrier pin devices which structurally connect the mounting carrier body and the secondary carrier body to form a combined carrier body;
   c. an outer rotatable body rotatably supported on the mounting carrier body and on the secondary carrier body;

d. a motor having a rotatable motor output shaft, wherein the motor is one of:
   mounted to and
   part of the mounting carrier body;
e. at least one cycloidal gear disc, wherein said at least one gear disc has at least two holes corresponding to said at least two carrier pin devices, and wherein each carrier pin device protrudes through a corresponding hole;
f. an eccentric body rotatably supporting the cycloidal gear disc and wherein the motor output shaft is arranged for rotating the eccentric body within the cycloidal gear disc,
g. wherein each said at least one gear disc is provided with an external gear profile and the outer rotatable body is provided with an internal gear profile and wherein the external gear profile of the cycloidal gear disc meshes with the internal gear profile of the outer rotatable body for transmitting rotational motion of the motor output shaft to the outer rotatable body, wherein the internal gear profile of the outer rotatable body is formed by an internal gear teeth profile and the external gear profile of the cycloidal gear disc is formed by an external gear teeth profile;
h. wherein the eccentric body is rotatably drivable by at least one of:
   the motor output shaft and
   a drive shaft connected to the motor output shaft,
i. wherein an external profile is provided on one of:
   the motor output shaft,
   the drive shaft and
   a separate outer bushing structurally connected to at least one of the drive shaft and the motor output shaft, and
j. wherein an axial opening formed in the corresponding eccentric body is provided with a corresponding internal profile.

2. The motor-gear drive unit of claim 1, further comprising a tire on an outer surface of the outer rotatable body for improving direct use of the drive unit as a motorized wheel in traction applications, and wherein a plane orthogonal to one of the motor output shaft and drive shaft intersects both a said cycloidal gear disc and the tire.

3. The motor-gear drive unit of claim 1, wherein the motor is an axial gap electric motor.

4. The motor-gear drive unit of claim 3, wherein the outer diameter of the outer rotatable body together with the tire is less than 250 mm and the width of the drive unit including the motor and the tire is less than 75 mm.

5. The motor-gear drive unit of claim 4, wherein said outer diameter is more than twice said width.

6. The motor-gear drive unit according to claim 1, wherein n≥3, and there are:
   n cycloidal gear discs; and
   n corresponding eccentric bodies, each with an internal profile wherein the number of faces of each said profile is equal to or a multitude of n.

7. The motor-gear drive unit of claim 1, wherein the mounting carrier body is a part of one of:
   a motor housing and
   a motor body
of the motor.

8. The motor-gear drive unit of claim 1, wherein the mounting carrier body is provided with an external body for facilitating mounting of the motor-gear drive unit only via the mounting carrier body to a device.

9. The motor-gear drive unit of claim 1, further comprising a bearing having raceways for supporting the outer rotatable body, and wherein at least some of the bearing raceways of the bearing supporting the outer rotatable body are manufactured in at least one of:
   the outer rotatable body,
   the mounting carrier body and
   the secondary carrier body.

10. A device formed as one of a mobile patient lift, a transportation cart and another vehicle, comprising a motor-gear drive unit as defined in claim 1, connected to the device via the mounting carrier body.

11. The motor-gear drive unit of claim 8, wherein the device is selected from the group consisting of:
   a mobile patient lift,
   a transportation cart and
   another vehicle.

* * * * *